United States Patent
Rao et al.

(10) Patent No.: US 8,423,470 B2
(45) Date of Patent: Apr. 16, 2013

(54) DISTRIBUTED SECURE ANONYMOUS CONFERENCING

(75) Inventors: Deepak P. Rao, Bellevue, WA (US); Dhigha D. Sekaran, Redmond, WA (US); Vadim Eydelman, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 641 days.

(21) Appl. No.: 11/859,737

(22) Filed: Sep. 21, 2007

(65) Prior Publication Data

US 2009/0083183 A1 Mar. 26, 2009

(51) Int. Cl.
- *G06Q 10/00* (2012.01)
- *G06F 15/16* (2006.01)
- *H04Q 11/00* (2006.01)
- *H04L 12/16* (2006.01)
- *H04L 9/08* (2006.01)

(52) U.S. Cl.
USPC ............. 705/50; 705/500; 709/204; 370/261; 370/270

(58) Field of Classification Search .................... 705/50, 705/1; 709/204; 370/261, 270
See application file for complete search history.

(56) References Cited

U.S. PATENT DOCUMENTS

| | | | |
|---|---|---|---|
| 4,920,565 A | 4/1990 | Strawczynski et al. | |
| 5,353,351 A | 10/1994 | Bartoli et al. | |
| 5,812,653 A | 9/1998 | Jodoin et al. | |
| 6,314,190 B1 * | 11/2001 | Zimmermann | 380/282 |
| 6,668,288 B1 | 12/2003 | Midwinter et al. | |
| 6,742,116 B1 * | 5/2004 | Matsui et al. | 713/171 |
| 6,851,053 B1 | 2/2005 | Liles et al. | |
| 6,866,586 B2 * | 3/2005 | Oberberger et al. | 463/42 |
| 7,168,089 B2 * | 1/2007 | Nguyen et al. | 726/4 |
| 7,213,145 B2 | 5/2007 | Sasmazel | |
| 8,126,968 B2 * | 2/2012 | Rodman et al. | 709/205 |
| 8,346,667 B2 | 1/2013 | Rao et al. | |
| 2002/0077178 A1 * | 6/2002 | Oberberger et al. | 463/42 |
| 2002/0078153 A1 * | 6/2002 | Chung et al. | 709/204 |
| 2002/0103864 A1 * | 8/2002 | Rodman et al. | 709/204 |
| 2002/0116615 A1 * | 8/2002 | Nguyen et al. | 713/168 |
| 2005/0094581 A1 | 5/2005 | Giloi et al. | |
| 2005/0220039 A1 * | 10/2005 | Hoshino et al. | 370/261 |
| 2005/0273852 A1 * | 12/2005 | Ferlitsch | 726/17 |
| 2005/0287990 A1 * | 12/2005 | Mononen et al. | 455/411 |

FOREIGN PATENT DOCUMENTS

| | | |
|---|---|---|
| EP | 0829160 A1 | 3/1998 |
| WO | 2005029738 A2 | 3/2005 |
| WO | 2006084962 A1 | 8/2006 |
| WO | WO2007/134260 A2 * | 11/2007 |

OTHER PUBLICATIONS

RFC 4353 ("A Framework for Conferencing with the Session Initiation Protocol", IETF Network Working Group, Feb. 2006, 21 pages).*

(Continued)

*Primary Examiner* — James D Nigh
(74) *Attorney, Agent, or Firm* — Merchant & Gould P.C.

(57) ABSTRACT

A communications manager of an enterprise receives an add-conference request to host a conference by the enterprise from an organizer client, wherein the conference to enable an anonymous user that does not have enterprise credentials to join the conference. The communications manager sends an add-conference response to the organizer client indicating that the conference is organized.

20 Claims, 7 Drawing Sheets

OTHER PUBLICATIONS

"Global conferencing, eLearning and conducting everyday business has never been more intuitive", www.jdhtech.com/pages/web4m.html, Obtained May 8, 2007.

"PalTalk 5.0", http://www.bluechillies.com/details/23190.html, Obtained May 8, 2007.

"What is VIA3?", http://www.viack.com/product/, Obtained May 8, 2007.

"Microsoft Office Communications Server 2007 Technical Overview", Published: Jul. 2007. Microsoft Corporation.

US Notice of Allowance mailed Aug. 22, 2012, in U.S. Appl. No. 12/946,753 (9 pages).

US Notice of Allowance mailed Nov. 30, 2012, in U.S. Appl. No. 12/946,753 (3 pages).

* cited by examiner

DISTRIBUTED SECURE ANONYMOUS CONFERENCING

BACKGROUND

An enterprise network allows an organization's members to collaborate and share data. Enterprise users may conduct conferences, such as Audio/Video (A/V) conferencing, instant messaging, and data sharing conferences, while connected to their enterprise network. However, people without enterprise credentials cannot participate in such conferences hosted by the enterprise network.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Embodiments of the invention are directed to distributed secure anonymous conferences. Embodiments herein provide a mechanism by which anonymous conferences hosted by an enterprise are organized. An anonymous conference includes a conference having at least one anonymous user. Anonymous users include conference attendees without enterprise credentials that may join a conference hosted by the enterprise.

Many of the attendant features will be more readily appreciated as the same become better understood by reference to the following detailed description considered in connection with the accompanying drawings.

BRIEF DESCRIPTION OF THE DRAWINGS

Like reference numerals are used to designate like parts in the accompanying drawings.

DETAILED DESCRIPTION

The detailed description provided below in connection with the appended drawings is intended as a description of the present examples and is not intended to represent the only forms in which the present examples may be constructed or utilized. The description sets forth the functions of the examples and the sequence of steps for constructing and operating the examples. However, the same or equivalent functions and sequences may be accomplished by different examples.

Figure 1:
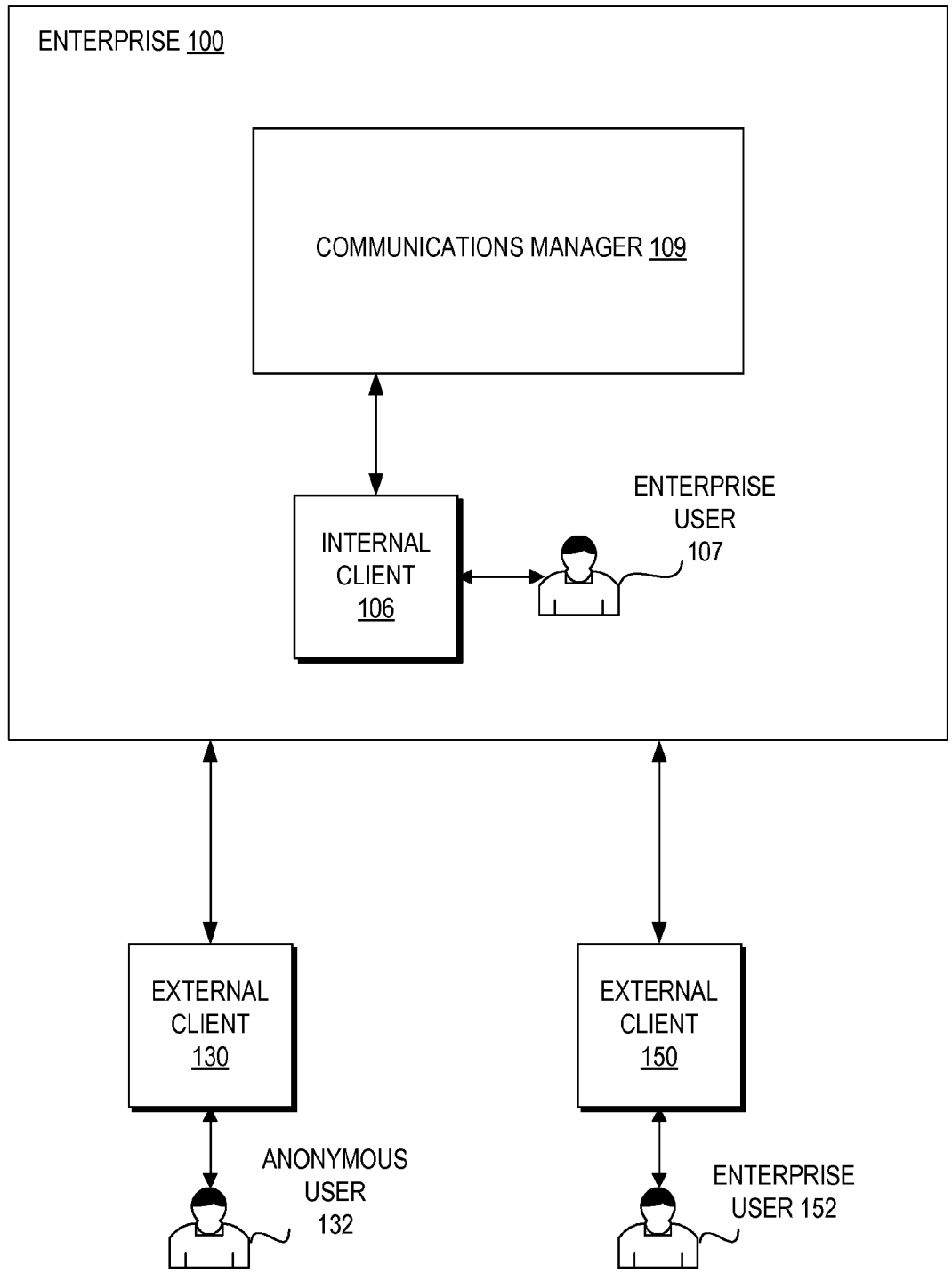
FIG. 1 is a block diagram of an enterprise in accordance with an embodiment of the invention.

FIG. 1 shows an enterprise 100 in accordance with an embodiment of the invention. Enterprise 100 includes various computing resources that may be associated with an organization, such as a corporation, educational institution, government agency, non-profit group, etc. Enterprise 100 includes a communications manager 109 that provides mechanisms by which anonymous conferences can be organized and mechanisms by which anonymous users can be allowed to securely join conferences hosted by enterprise 100. In one embodiment, communications manager 109 includes Microsoft® Office Communications Server (OCS). In one embodiment, communications manager 109 may be implemented using computer readable instructions executed by one or more computing devices, such as servers. An example computing device for use as a client, a server, etc., in enterprise 100 is discussed below in conjunction with FIG. 7.

FIG. 1 also shows an enterprise user 107 that may connect to enterprise 100 via an internal client 106. An enterprise user 152 may also connect to enterprise 100 via external client 150 using another network, such as the Internet (e.g., using a home computer over an Internet Service Provider (ISP) connection). An anonymous user 132 may connect to a conference hosted by enterprise 100 via external client 130. In an alternative embodiment, an anonymous user may join a conference from an internal client. For example, a user visiting from Company A (i.e., an anonymous user) may use their own laptop computer to connect to a wireless access point at Company B (i.e., enterprise 100) to join a conference hosted by Company B.

Embodiments of communications manager 109 allow enterprise users to securely conduct A/V conferencing, instant messaging, and data sharing conferences while being connected to their internal enterprise network or from the Internet without a Virtual Private Network (VPN). These enterprise users can organize and/or join conferences using their enterprise credentials. Enterprise credentials include means to access the enterprise network such as username/password, a smartcard, and the like.

In addition, communications manager 109 also enables anonymous conferencing. Anonymous conferencing is a scenario where enterprise users invite people from outside the organization to take part in a meeting. For example, a sales team might want to conduct a live online product demo to people outside the company. "Anonymous users" is a term for people outside the company that lack any established enterprise credentials. Using embodiments herein, such anonymous users have the ability to participate in the meeting not just as attendees but also as presenters in the meeting. These anonymous users need to securely participate in a meeting hosted within the enterprise network of the meeting organizer and typically connect from the Internet. In embodiments herein, the organizer provides anonymous users with a conference identifier (ID) and a conference key (e.g., a cryptographically secure string of data) to authenticate and authorize the anonymous users admission to a conference.

As used herein, a conference may include any communication between two or more people. Examples include A/V conferencing, Instant Messaging (IM), and the like. It will be appreciated that A/V conferencing includes audio only conferences, conferences with audio and video, or a mix of audio and video where some conference attendees have audio only while other attendees have audio and video.

Figure 2:
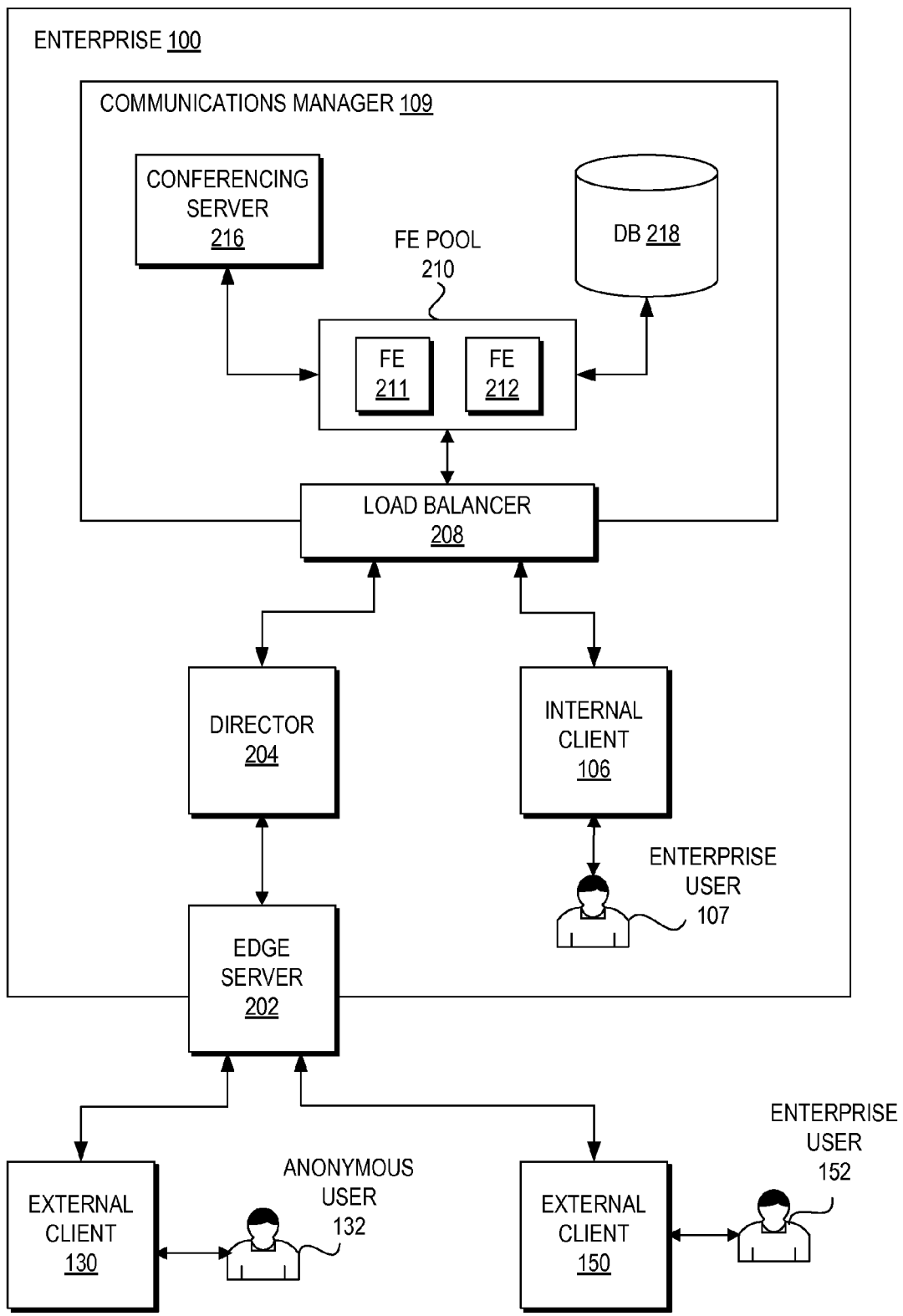
FIG. 2 is a block diagram of an enterprise in accordance with an embodiment of the invention.

Turning to FIG. 2, another embodiment of enterprise 100 is shown. In one embodiment, the architecture in FIG. 2 includes the Microsoft® Office Communications Server 2007 Enterprise Edition. In FIG. 2, enterprise 100 includes one or more edge servers 202. Edge server 202 handles traffic across the enterprise firewall (such as Session Initiation Protocol (SIP) traffic) to establish and validate connections. In one embodiment, edge server 202 does not authenticate users (authentication may be conducted by director 204 or a Front End (FE) server, such as FE 211).

Edge server 202 is connected to director 204. Director 204 is the first authentication server within enterprise 100 and acts as a line of defense in safeguarding internal servers from attacks, such as by anonymous user 132.

Director 204 is connected to a load balancer 208 for communications manager 109. In FIG. 2, communications from internal clients to communications manager 109 are also routed through load balancer 208. In one embodiment, load balancer 208 is a hardware IP load balancer.

In the embodiment of FIG. 2, communications manager 109 may be implemented using one or more Front End (FE) servers in an FE pool 210, one or more conferencing servers 216, and a database 218. While in FIG. 2, FE pool 210 includes FE servers 211 and 212, it will be appreciated that FE pool 210 may include alternative number of FE servers. FE pool 210 provides IM, presence, and conferencing services. FE pool 210 is connected to a database (DB) 218 that stores user and conferencing related information. DB 218 may reside on a separate physical machine or reside with one or more FEs in pool 210. In other embodiments, communications manager 109 may include additional FE pools that have their own associated databases and conferencing servers.

FEs in pool 210 are also connected to one or more conferencing servers 216 (also referred to as a Multipoint Control Unit (MCU)) that are used in conducting a conference. Conferencing server 216 is responsible for managing one or more media types, such as IM conferencing, telephony conferencing, web conferencing for conference data collaboration (e.g., sharing a Microsoft PowerPoint® presentation), and A/V conferencing.

Figure 3:
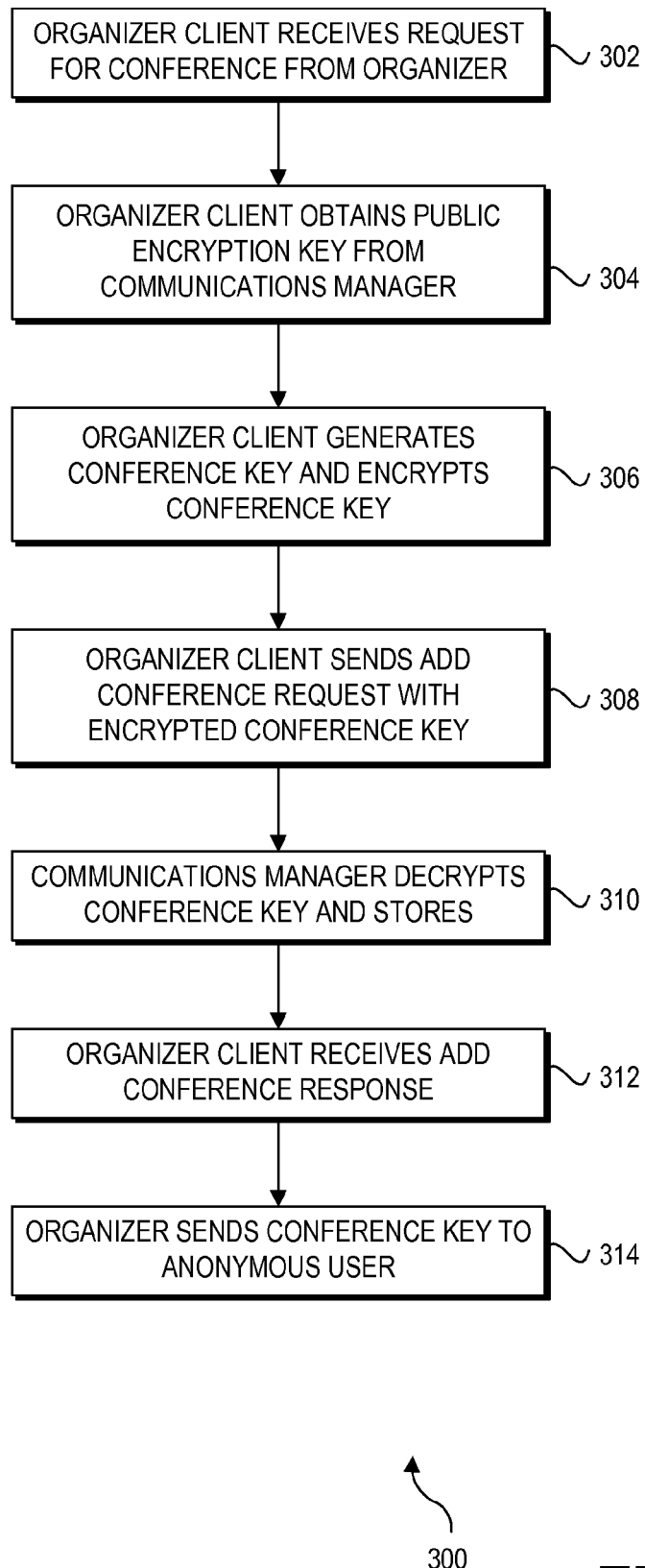
FIG. 3 is a flowchart showing operations of organizing an anonymous conference in accordance with an embodiment of the invention.

Turning to FIG. 3, a flowchart 300 shows operations of organizing an anonymous conference in accordance with an embodiment of the invention. In one embodiment, at least a portion of flowchart 300 may be implemented by computer readable instructions executable by one or more computing devices. Starting with operation 302, a conference organizer client receives a request to setup a conference from an organizer. The organizer of a conference is typically an enterprise user (i.e., has enterprise credentials). The organizer client may connect to enterprise 100 from inside or outside the enterprise network.

Continuing to operation 304, in response to the conference request from the organizer, the organizer client obtains a public encryption key from the communications manager. The communications manager retains the corresponding private key. Next, in operation 306, the organizer client generates a conference key and encrypts the conference key with the public encryption key received from the communications manager in operation 304. In one embodiment, the conference key is a cryptographically secure string of data that an anonymous user will use to join a conference.

Continuing to operation 308, the organizer client sends an add conference request to the communications manager. The add conference request includes the encrypted conference key. Next, in operation 310, the communications manager decrypts the conference key and stores the conference key. The conference key will be used to verify an anonymous user when an anonymous user requests to join a conference.

Proceeding to operation 312, the organizer client receives an add conference response from the communications manager. The add conference response confirms that the conference key has been received and the requested conference has been setup.

Next, in operation 314, the organizer (i.e., the human enterprise user) sends the conference key to one or more anonymous users that are to join the conference. It will be appreciated that the same conference key is sent to each anonymous user. The conference key may be distributed to the anonymous users as desired by the organizer. For example, the conference key may be sent to an anonymous user in a secure email, such as by encrypting the email message. In another example, the conference key may be sent in the clear to an anonymous user over a secured connection. In yet another example, the organizer may call an anonymous user and tell the anonymous user the conference key over a telephone.

Figure 4:
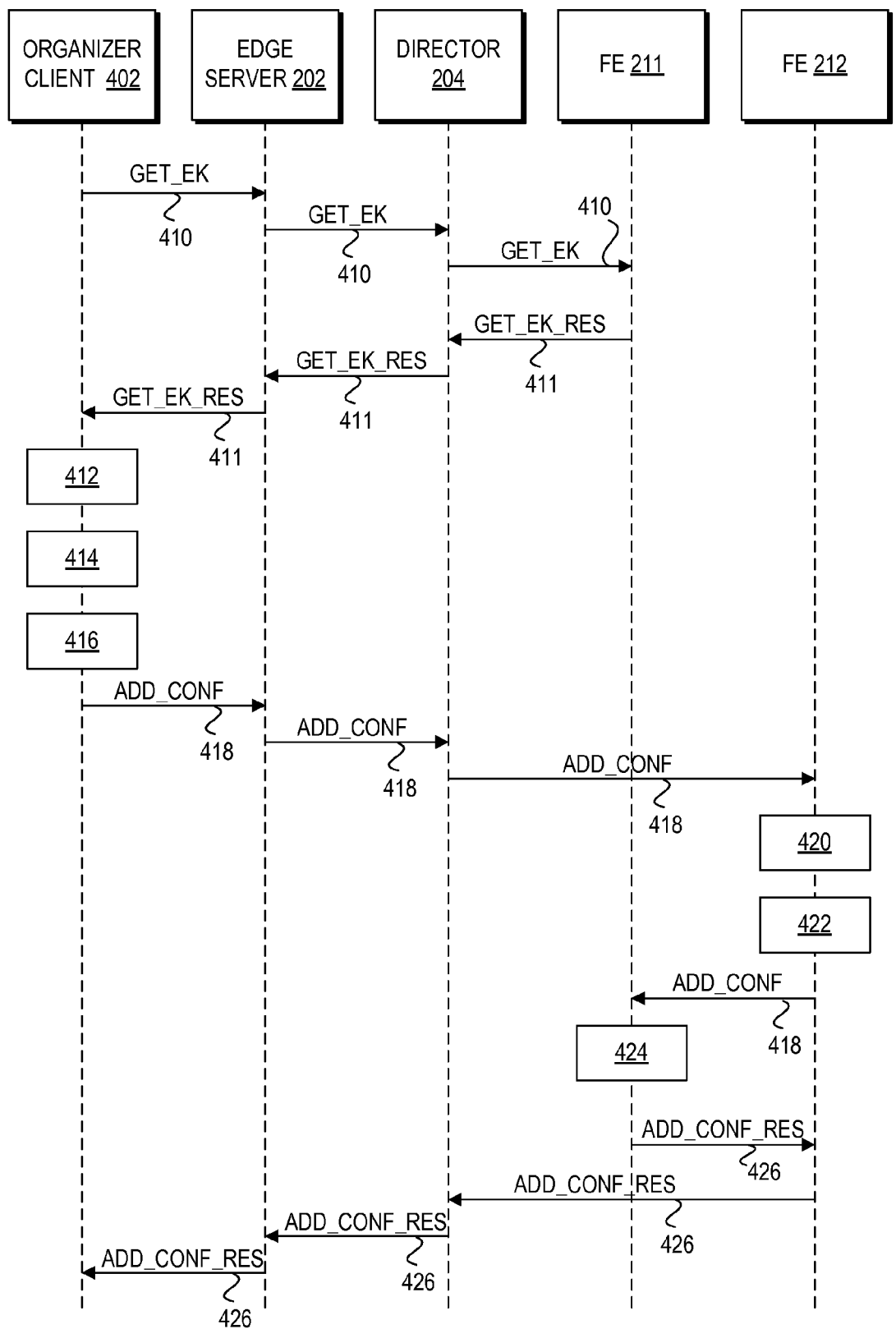
FIG. 4 is a flow diagram of organizing an anonymous conference in accordance with an embodiment of the invention.

Turning to FIG. 4, a flow diagram 400 shows operations of organizing an anonymous conference in accordance with an embodiment of the invention. Flow diagram 400 will be discussed in relation to the embodiment of enterprise 100 shown in FIG. 2. In one embodiment, at least a portion of flow diagram 400 may be implemented by computer readable instructions executable by one or more computing devices.

Organizer client 402 receives a request from a conference organizer (i.e., an enterprise user) to setup a conference. Organizer client 402 sends a getEncryptionKey request (GET_EK) 410 to edge server 202 which in turn sends the request to director 204 which in turn sends the request to communications manager 109. Load balancer 208 assigns the request to one of the FE servers in pool 210. In FIG. 4, request 410 is assigned to FE 211. Alternatively, when organizer client 402 is inside the enterprise network, the getEncryptionKey request (GET_EK) 410 and other communications discussed below may be sent from organizer client 402 to FE pool 210 without passing through edge server 202 and/or director 204.

FE 211 sends a getEncryptionKey response (GET_EK_RES) 411 back to organizer client 402. Response 411 includes the public encryption key that organizer client will use to encrypt the conference key. FE 211 retains the private encryption key corresponding to the public encryption key. In one embodiment, FE 211 uses an RSA algorithm to generate the public/private key pair.

In one embodiment, FE 211 may include opaque data in getEncryptionKey response (GET_EK_RES) 411. To support highly-available conferencing, communications manager 109 may contain multiple FEs behind load balancer 208. As such, it is possible for the add conference request to terminate on a different server from the one that handled the get encryption key request. When FEs do not share the same private encryption key (which is a typical deployment scenario) this can be problematic because the server receiving the add conference request has no way of decrypting the conference key using the private key configured on another FE.

To solve this problem, the get encryption key response may also contain a server identifier. The server identifier must be reflected back to the FE servers in an add conference request along with the encrypted conference key. In one embodiment, the server identifier includes a piece of "opaque" data. Opaque data is data placed in a data structure that the system defines and that has an intentionally hidden internal structure. Recipients such as the organizer's client make no assumptions regarding the contents of this opaque data and simply pass this information back to the system at a later stage. This opaque data contains information about the FE that provided the public encryption key. When an add conference request is received at a different FE, it verifies that the target FE is a member of the pool, and forwards the request to that FE.

Once organizer client 402 receives the public encryption key, organizer client 402 may perform various operations. In operation 412, organizer client 402 saves the server identifier, such as opaque data, received in the getEncryptionKeyresponse (GET_EK_RES) 411. In operation 414, organizer client generates a conference key and encrypts the conference key using the public encryption key received from FE 211. In operation 416, organizer client 402 creates an addConference request (ADD_CONF) 418 that includes the encrypted conference key. In one embodiment, request 418 may also include the server identifier (e.g., opaque data). Organizer client 402 may include other conference data in request 418 such as a conference identifier, conference restrictions (e.g., identify which attendees may be PowerPoint presenters), make the conference re-occurring (e.g., every two weeks), and the like.

The addConference request (ADD_CONF) 418 is sent to FE pool 210 via edge server 202 and director 204. Since FE pool 210 is behind load balancer 208, in this example, the add conference request 418 is sent to FE 212. FE 212 reads the server identifier, as shown by operation 420. Next, in operation 422, FE 212 verifies that the specified FE (i.e., FE 211) belongs to FE pool 210 and routes the add conference request 418 to the correct FE (i.e., FE 211). If the specified FE is not in FE pool 210, then addConference request 418 is returned as failed. Organizer client 402 may attempt to request another encryption key from a valid FE and re-send the addConference request.

As shown by operation 424, FE 211 decrypts the conference key and stores the conference key and any other conference data. In one embodiment, the conference key and other data are saved in database 218. FE 211 then sends an addConference response (ADD_CONF_RES) 426 back to organizer client 402. As shown in FIG. 4, response 426 is sent back to FE 212 (the server that was originally assigned addConference request 418) and then to director 204 and edge server 202 to organizer client 402. Response 426 confirms that the conference has been organized and is ready for attendees to join at the scheduled time.

Figure 5:
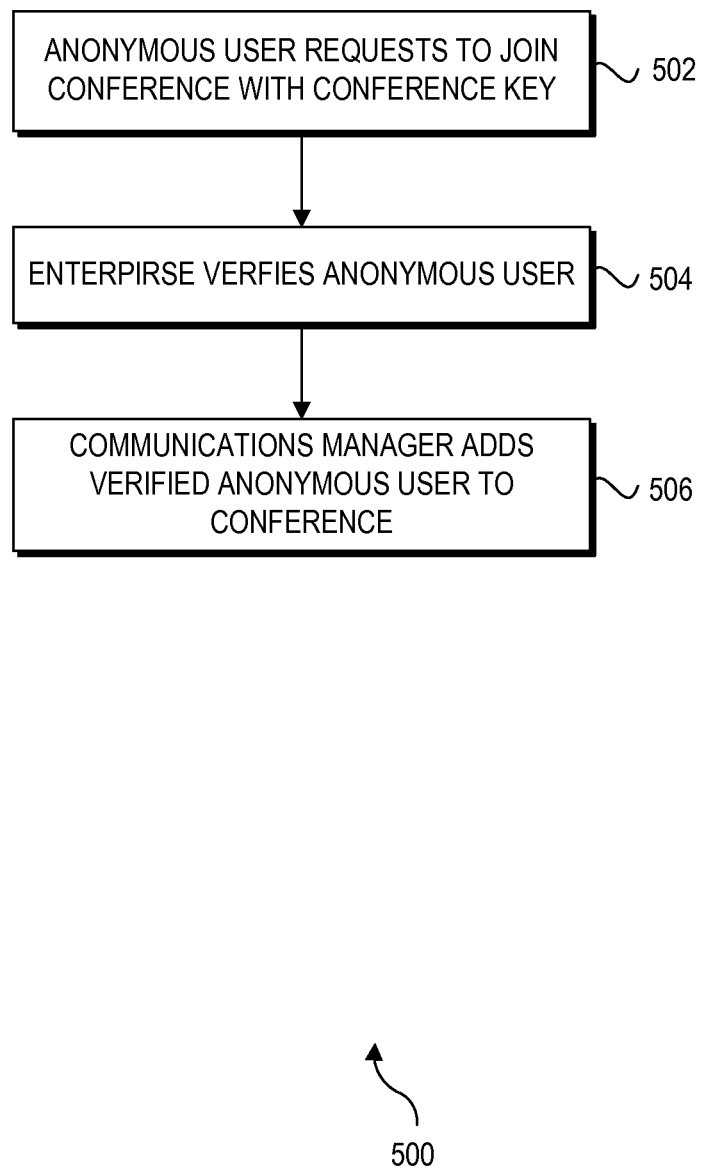
FIG. 5 is a flowchart showing operations of an anonymous user joining an anonymous conference in accordance with an embodiment of the invention.

Turning to FIG. 5, a flowchart 500 shows operations of an anonymous user joining an anonymous conference in accordance with an embodiment of the invention. In one embodiment, at least a portion of flowchart 500 may be implemented by computer readable instructions executable by one or more computing devices. Starting with operation 502, an anonymous user requests to join a conference. The anonymous user's join request includes the conference key. The join request may also include other information such as a conference identifier, an identity for the anonymous user, and the like.

Proceeding to operation 504, enterprise 100 verifies the anonymous user has the correct conference key, such as by using an authentication server. In one embodiment, the conference key received from the anonymous user client is compared to a conference key stored at communications manager 109 to determine if the conference keys match. Anonymous user client 602 may send the conference key using various security measures such as a secure channel, hashing, and the like. Next, in operation 506, once the anonymous user is verified, the anonymous user is added to the conference.

It will be appreciated that the operations in flowcharts 400 and 600 may occur at various temporal distances. For example, an organizer may setup a conference ahead of time (via flowchart 400), but the anonymous user may not actual join the conference until days or weeks later (via flowchart 600). In another example, an organizer may need to add an anonymous user to a conference that will begin in minutes or that is already occurring. In this example, the operations of flowcharts 400 and 600 may occur very close together in time.

Figure 6:
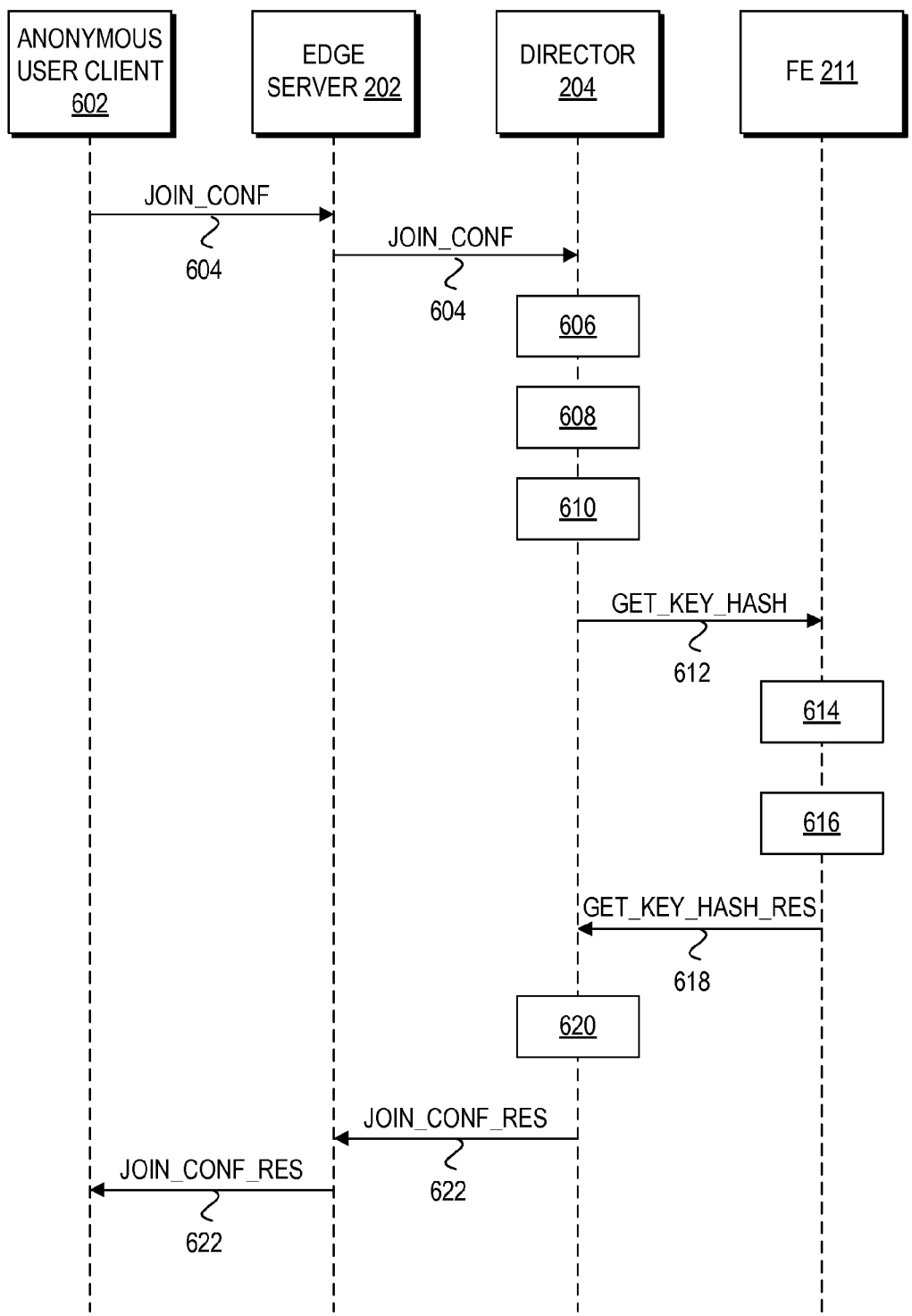
FIG. 6 is a flow diagram of an anonymous user joining an anonymous conference in accordance with an embodiment of the invention.

Turning to FIG. 6, a flow diagram 600 shows operations of an anonymous user joining an anonymous conference in accordance with an embodiment of the invention. Flow diagram 600 will be discussed in relation to the embodiment of enterprise 100 shown in FIG. 2. In one embodiment, at least a portion of flow diagram 600 may be implemented by computer readable instructions executable by one or more computing devices.

An anonymous user uses anonymous user client 602 to send a joinConference request (JOIN_CONF) 604 to communications manager 109. Request 604 is received by edge server 202 which passes request 604 to director 204. In FIG. 6, anonymous user client 602 is connected from outside the enterprise network. In another embodiment, an anonymous user may connect to enterprise 100 using an enterprise network access point (e.g., anonymous user from company A connects their laptop to wireless access point in a conference room at company B). In this embodiment, anonymous user joinConference request 604 may be sent to director 204 without passing through edge server 202.

Request 604 may include a conference ID, a hash of the conference key, and an anonymous user identity. The conference key is hashed as a security measure for sending the conference key to enterprise 100. In one embodiment, hashing mechanisms used by the Digest authentication algorithm may be used.

When director 204 receives joinConference request 604, director 204 may perform various operations. In operation 606, director 204 retrieves the conference key hash, conference ID, and anonymous user identity from joinConference request 604. In operation 608, director 204 locates the FE server pool that hosts the conference for the organizer. Since director 204 does not have access to the database that stores the conference key, director 204 must locate the correct FE pool. In FIG. 6, the correct FE pool is pool 210.

Next, in operation 610, director 204 issues an HTTP request called getConferenceKeyHash request (GET_KEY_HASH) 612 to the located FE pool to obtain a hash of the conference key stored in the pool's database. In FIG. 2, database 218 stores the conference keys for FE pool 210. In FIG. 6, FE 211 responds to request 612, but it will be understood that any FE in FE pool 210 could have responded to request 612 as assigned by load balancer 208. In one embodiment, an HTTP-based mechanism is used for obtaining the hash from the FE pool, instead of a SIP-based mechanism, to ensure that an attack of the HTTP channel by a malicious anonymous user does not interfere with existing SIP-based traffic in enterprise 100. It will be appreciated that any alternate mechanism such as Remote Procedure Call may be used in place of HTTP for obtaining the hash from the FE pool.

When FE 211 receives getConferenceKeyHash request 612, FE 211 verifies that the anonymous user identity, included in request 612, has not been used in the conference already (discussed further below), as shown by operation 614. Next, in operation 616, FE 211 retrieves the appropriate conference key from database 218 and computes the hash of the conference key. FE 211 then sends the hashed conference key to director 204 in a getConferenceKeyHash response (GET_KEY_HASH_RES) 618.

Director 204 then compares the hashed conference key received from anonymous user client 602 to the hashed conference key received from FE 211 to determine if the anonymous user possesses the correct conference key, as shown by operation 620. Director 204 sends a joinConference response (JOIN_CONF_RES) 622 to anonymous user client 602 via edge server 202. Response 622 indicates whether the anonymous user is admitted to the conference because the hashed conference key matches or denied admission to the conference. In other embodiments, the conference key may be passed using other secure means (e.g., the conference key may be sent in the clear in a secure channel between client 602 and FE 211).

It will be appreciated that director 204 only handles a hash of the conference key and does not see the conference key in the clear from the anonymous user client 602 or from FE 211. In this way, only the endpoints of the joinConference communication see the actual conference key. Thus, if an attacker was running a trace on director 204 (or any other intermediary server), the attacker sees only a hash of the conference key and not the actual conference key.

Authenticating a user establishes a security association on both the server and the client. This security association can be referenced in subsequent requests to prevent being challenged again. For enterprise users, this security association can be used to route arbitrary requests, including those destined to other conferences, through the infrastructure. However, anonymous users are not provided this luxury. To provide such a safeguard, the authenticating server (e.g., director 204 or a front end server) stamps the security association with the conference identifier for the conference that the anonymous user was successfully authenticated for and ensures that all subsequent requests from this anonymous user are only for this conference. Any request from this anonymous user that does not target this conference is rejected.

In one embodiment, all anonymous users present an arbitrary identity (e.g., a username) and a single hashed conference key to join a conference with the joinConference request. Enterprise users on the other hand use their established identities with distinct credentials to join a conference. The conferencing infrastructure permits the same user to join a conference a certain number of times after which the oldest connected endpoint is removed from the conference. This design exists to protect the infrastructure from abuse and is easy to enforce for enterprise users since they have distinct verifiable identities but is hard to do for anonymous users since they all present the same credentials (i.e., the same conference key) for a particular conference with unverifiable arbitrary identities. This allows for the possibility that a malicious anonymous user can impersonate an existing anonymous user in the conference and exceed that user's connection limit thus resulting in that user being removed from the conference.

To prevent this threat, communications manager 109 ensures that the anonymous user identity being presented by the anonymous user is not already being used in the conference. If only one anonymous user is allowed to use a particular identity, it prevents another anonymous user from using the same identity thus mitigating the threat. In one embodiment, if the identity from an anonymous user is already in use by another user in the conference, then the anonymous user is not allowed to join the conference. The anonymous user may re-attempt to join the conference with a different anonymous user identity. There is a small race condition when two anonymous users present the same identity but guidelines for creating anonymous identities can clearly indicate that they have to be cryptographically unpredictable identities with low probability for collision so the race condition is minimized.

Embodiments of the invention allow a person without enterprise credentials to securely join a conference hosted by the enterprise. An anonymous conference is organized and a conference key is provided to anonymous users. When joining a conference, an anonymous user presents the conference key for verification. Thus, a person from outside an organization may participate in the conference without the burden of setting up enterprise credentials for that person. Also, the enterprise maintains security and typical server logging when hosting the conference.

Figure 7:
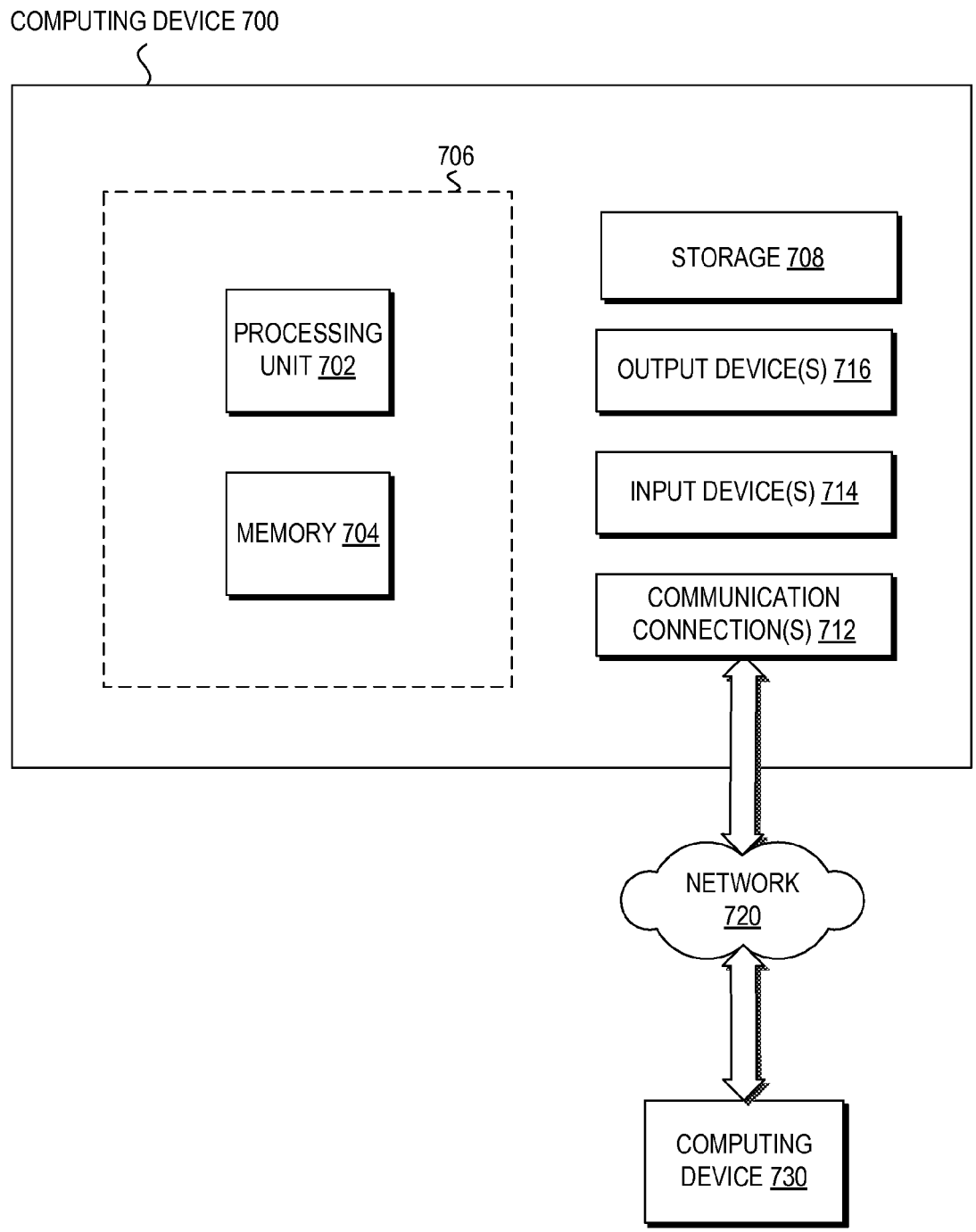
FIG. 7 is a block diagram of an example computing device for implementing embodiments of the invention.

FIG. 7 and the following discussion provide a brief, general description of a suitable computing environment to implement embodiments of the invention. The operating environment of FIG. 7 is only one example of a suitable operating environment and is not intended to suggest any limitation as to the scope of use or functionality of the operating environment. Other well known computing devices, environments, and/or configurations that may be suitable for use with embodiments described herein include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments of the invention are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 7 shows an example of a computing device 700 for implementing one or more embodiments of the invention. Various devices of enterprise 100 may be implemented using variations of computing device 700, such as a client, edge server 202, director 204, an FE in FE pool 210, conferencing server 216, database 218, and the like. In one configuration, computing device 700 includes at least one processing unit 702 and memory 704. Depending on the exact configuration and type of computing device, memory 704 may be volatile (such as RAM), non-volatile (such as ROM, flash memory, etc.) or some combination of the two. This configuration is illustrated in FIG. 7 by dashed line 706.

In other embodiments, device 700 may include additional features and/or functionality. For example, device 700 may also include additional storage (e.g., removable and/or non-removable) including, but not limited to, magnetic storage, optical storage, and the like. Such additional storage is illustrated in FIG. 7 by storage 708. In one embodiment, computer readable instructions to implement embodiments of the invention may be in storage 708. Storage 708 may also store other computer readable instructions to implement an operating system, an application program, and the like.

The term "computer readable media" as used herein includes computer storage media. Computer storage media includes volatile and nonvolatile, removable and non-removable media implemented in any method or technology for storage of information such as computer readable instructions or other data. Memory 704 and storage 708 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 700. Any such computer storage media may be part of device 700.

Device 700 may also include communication connection(s) 712 that allow device 700 to communicate with other devices. Communication connection(s) 712 may include, but is not limited to, a modem, a Network Interface Card (NIC), an integrated network interface, a radio frequency transmitter/receiver, an infrared port, a USB connection, or other interfaces for connecting computing device 700 to other computing devices. Communication connection(s) 712 may include a wired connection or a wireless connection. Communication connection(s) 712 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, Near Field Communication (NFC), and other wireless media.

Device 700 may include input device(s) 714 such as keyboard, mouse, pen, voice input device, touch input device, infrared cameras, video input devices, and/or any other input device. Output device(s) 716 such as one or more displays, speakers, printers, and/or any other output device may also be included in device 700. Input device(s) 714 and output device(s) 716 may be connected to device 700 via a wired connection, wireless connection, or any combination thereof. In one embodiment, an input device or an output device from another computing device may be used as input device(s) 714 or output device(s) 716 for computing device 700.

Components of computing device 700 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 700 may be interconnected by a network. For example, memory 704 may be comprised of multiple physical memory units located in different physical locations interconnected by a network.

In the description and claims, the term "coupled" and its derivatives may be used. "Coupled" may mean that two or more elements are in contact (physically, electrically, magnetically, optically, etc.). "Coupled" may also mean two or more elements are not in contact with each other, but still cooperate or interact with each other (for example, communicatively coupled).

Those skilled in the art will realize that storage devices utilized to store computer readable instructions may be distributed across a network. For example, a computing device 730 accessible via network 720 may store computer readable instructions to implement one or more embodiments of the invention. Computing device 700 may access computing device 730 and download a part or all of the computer readable instructions for execution. Alternatively, computing device 700 may download pieces of the computer readable instructions, as needed, or some instructions may be executed at computing device 700 and some at computing device 730.

Those skilled in the art will also realize that all or a portion of the computer readable instructions may be carried out by a dedicated circuit, such as a Digital Signal Processor (DSP), programmable logic array, and the like.

Various operations of embodiments of the present invention are described herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment of the invention.

The above description of embodiments of the invention, including what is described in the Abstract, is not intended to be exhaustive or to limit the embodiments to the precise forms disclosed. While specific embodiments and examples of the invention are described herein for illustrative purposes, various equivalent modifications are possible, as those skilled in the relevant art will recognize in light of the above detailed description. The terms used in the following claims should not be construed to limit the invention to the specific embodiments disclosed in the specification. Rather, the following claims are to be construed in accordance with established doctrines of claim interpretation.

What is claimed is:

1. A computer-implemented method, comprising:
receiving, by a communications manager of an enterprise, the communications manager comprising one or more servers associated with the enterprise, a request for a public encryption key, wherein the request is from an organizer client;
sending, by the communications manager, the public encryption key in response to the request;
receiving, at the communications manager, an add-conference request to host a conference from the organizer client, wherein the add-conference request comprises an encrypted conference key and any conference restrictions, the conference key being encrypted with the public encryption key, wherein the conference is configured to enable an anonymous user to join the conference, the anonymous user being associated with a user without enterprise credentials, and wherein the conference key is stored at the communications manager;
sending, by the communications manager, an add-conference response to the organizer client indicating that the conference is organized;
receiving, at the communications manager, a join-conference request from an enterprise user client;
allowing the enterprise user client to join the conference hosted by the organizer client using an established identity of the enterprise user client;
receiving, at the communications manager, a join-conference request from an anonymous user client, wherein the anonymous user at the anonymous user client does not have enterprise credentials, and wherein the join-conference request includes a conference key;
comparing the conference key received from the anonymous user client to the conference key stored at the communications manager; and
allowing the anonymous user client to join the conference hosted by the organizer client when the conference key received from the anonymous user client and the conference key stored at the communications manager match.

2. The method of claim 1, wherein the request for a public encryption key comprises a getEncryptionKey request.

3. The method of claim 1, further comprising:
sending a server identifier to the organizer client from the communications manager, wherein the server identifier identifies a server that generated the public encryption key.

4. The method of claim 1, further comprising:
decrypting the encrypted conference key with a private encryption key; and
storing the decrypted conference key.

5. The method of claim 3, wherein the server identifier includes opaque data.

6. The method of claim 1, wherein the join-conference request from the anonymous user client includes an anonymous user identity for the anonymous user client, and wherein the anonymous user client is not allowed to join the conference when the anonymous user identity is already in use in the conference.

7. A computer readable storage medium, the medium having computer-executable instructions stored thereon for providing a method for organizing a conference for an enterprise user client and an anonymous user client, the method comprising:
receiving, by a communications manager of an enterprise, the communications manager being implemented using one or more servers associated with the enterprise, a request for a public encryption key, wherein the request is from an organizer client;
sending, by the communications manager, the public encryption key in response to the request;
receiving, at the, an add-conference request to host a conference from the organizer client, wherein the add-conference request comprises an encrypted conference key and any conference restrictions, the conference key being encrypted with the public encryption key, wherein the conference is configured to enable an anonymous user to join the conference, the anonymous user being associated with a user without enterprise credentials, and wherein the conference key is stored at the communications manager;
sending, by the communications manager, an add-conference response to the organizer client indicating that the conference is organized;
receiving, at the communications manager, a join-conference request from an enterprise user client;
allowing the enterprise user client to join the conference hosted by the organizer client using an established identity of the enterprise user client;
receiving, at the communications manager, a join-conference request from an anonymous user client, wherein the anonymous user at the anonymous user client does not have enterprise credentials, and wherein the join-conference request includes a conference key;
comparing the conference key received from the anonymous user client to the conference key stored at the communications manager; and
allowing the anonymous user client to join the conference hosted by the organizer client when the conference key received from the anonymous user client and the conference key stored at the communications manager match.

8. The computer readable storage medium of claim 7, wherein the request for a public encryption key comprises a getEncryptionKey request.

9. The computer readable storage medium of claim 7, further comprising:
sending a server identifier to the organizer client from the communications manager, wherein the server identifier identifies a server that generated the public encryption key.

10. The computer readable storage medium of claim 7, further comprising:
decrypting the encrypted conference key with a private encryption key; and
storing the decrypted conference key.

11. The computer readable storage medium of claim 9, wherein the server identifier includes opaque data.

12. The computer readable storage medium of claim 7, wherein the join-conference request from the anonymous user client includes an anonymous user identity for the anonymous user client, and wherein the anonymous user client is not allowed to join the conference when the anonymous user identity is already in use in the conference.

13. A computer implemented system comprising:
a processor; and
a memory communicatively coupled to the processor, the memory having computer-executable instructions, that when executed by the processor, provide a method for organizing a conference for an enterprise user client and an anonymous user client, the method comprising:
receiving, by a communications manager of an enterprise, the communications manager comprising one or more servers associated with the enterprise, a request for a public encryption key, wherein the request is from an organizer client;
sending, by the communications manager, the public encryption key in response to the request;
receiving, at the communications manager, an add-conference request to host a conference from the organizer client, wherein the add-conference request comprises an encrypted conference key and any conference restrictions, the conference key being encrypted with the public encryption key, wherein the conference is configured to enable an anonymous user to join the conference, the anonymous user being associated with a user without enterprise credentials, and wherein the conference key is stored at the communications manager;
sending, by the communications manager, an add-conference response to the organizer client indicating that the conference is organized;
receiving, at the communications manager, a join-conference request from an enterprise user client;
allowing the enterprise user client to join the conference hosted by the organizer client using an established identity of the enterprise user client;
receiving, at the communications manager, a join-conference request from an anonymous user client, wherein the anonymous user at the anonymous user client does not have enterprise credentials, and wherein the join-conference request includes a conference key;
comparing the conference key received from the anonymous user client to the conference key stored at the communications manager; and
allowing the anonymous user client to join the conference hosted by the organizer client when the conference key received from the anonymous user client and the conference key stored at the communications manager match.

14. The computer implemented system of claim 13, wherein the request for a public encryption key comprises a getEncryptionKey request.

15. The computer implemented system of claim 13, further comprising:
sending a server identifier to the organizer client from the communications manager, wherein the server identifier identifies a server that generated the public encryption key.

16. The computer implemented system of claim 13, further comprising:
    decrypting the encrypted conference key with a private encryption key; and storing the decrypted conference key.

17. The computer implemented system of claim 15, wherein the server identifier includes opaque data.

18. The computer implemented system of claim 13, wherein the join-conference request from the anonymous user client includes an anonymous user identity for the anonymous user client, and wherein the anonymous user client is not allowed to join the conference when the anonymous user identity is already in use in the conference.

19. The computer-implemented method of claim 1, wherein the one or more servers comprise an edge server, a director server, and a front edge server.

20. The computer readable storage medium of claim 7, wherein the one or more servers comprise an edge server, a director server, and a front edge server.

* * * * *